(12) United States Patent
Kim et al.

(10) Patent No.: US 10,487,178 B2
(45) Date of Patent: Nov. 26, 2019

(54) DMPA-BASED SOLVENT SYSTEMS FOR THE SYNTHESIS OF POLY (AMIC ACID) AND POLYIMIDE POLYMERS

(71) Applicant: Dow Global Technologies LLC, Midland, MI (US)

(72) Inventors: Eung Kyu Kim, Midland, MI (US); William J. Harris, Freeport, TX (US); Qi Jiang, Shanghai (CN); Xin Jiang, Shanghai (CN); Kaoru Ohba, Tokyo (JP)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/544,404

(22) PCT Filed: Sep. 28, 2016

(86) PCT No.: PCT/CN2016/100465
§ 371 (c)(1),
(2) Date: Jul. 18, 2017

(87) PCT Pub. No.: WO2018/058343
PCT Pub. Date: Apr. 5, 2018

(65) Prior Publication Data
US 2019/0202989 A1    Jul. 4, 2019

(51) Int. Cl.
*C08G 73/10*    (2006.01)

(52) U.S. Cl.
CPC ..... *C08G 73/1071* (2013.01); *C08G 73/1032* (2013.01)

(58) Field of Classification Search
CPC ............ C09D 7/20; C08L 79/08; C08G 73/10
See application file for complete search history.

(56) References Cited

U.S. PATENT DOCUMENTS

| | | |
|---|---|---|
| 3,410,826 A | 11/1968 | Endrey |
| 5,789,524 A | 8/1998 | Hsu et al. |
| 5,919,892 A | 7/1999 | Hwang et al. |
| 5,955,568 A * | 9/1999 | Choi ............ C08G 73/14 528/170 |
| 9,346,927 B2 | 5/2016 | Ohya et al. |
| 2014/0378584 A1 | 12/2014 | Reynolds |
| 2015/0018466 A1 | 1/2015 | Reynolds |
| 2015/0299393 A1 | 10/2015 | Kelly et al. |
| 2016/0208097 A1 | 7/2016 | Bu et al. |
| 2016/0347958 A1 | 12/2016 | Reynolds |
| 2017/0044322 A1 | 2/2017 | Niguchi et al. |
| 2017/0137571 A1 | 5/2017 | Nakayama et al. |

FOREIGN PATENT DOCUMENTS

| | | |
|---|---|---|
| CN | 101649055 A | 2/2010 |
| EP | 2910591 A1 | 8/2015 |
| JP | H01-260015 A | 10/1989 |
| JP | 2013-32501 A | 2/2013 |
| JP | WO 201038538 * | 3/2014 |

* cited by examiner

*Primary Examiner* — Gregory Listvoyb
(74) *Attorney, Agent, or Firm* — Quarles & Brady LLP

(57) ABSTRACT

The process for synthesizing a poly(amic acid) polymer or a polyimide polymer is improved by using a solvent system consisting essentially of:
(A) a first component consisting essentially of N,N-dimethyl propionamide (DMPA), and
(B) optionally, a second component consisting essentially of at least one of a sulfoxide, e.g., DMSO, an alkyl phosphate, e.g., triethyl phosphate, and an aprotic glycol ether, e.g., propylene glycol methyl ether acetate.

4 Claims, No Drawings

DMPA-BASED SOLVENT SYSTEMS FOR THE SYNTHESIS OF POLY (AMIC ACID) AND POLYIMIDE POLYMERS

BACKGROUND OF THE INVENTION

This invention relates to an environmentally friendly, solvent system for the synthesis of poly(amic acid) (PAA) and polyimide (PI) polymers.

Polyimide polymers are useful in a variety of applications, including the manufacture of electronic devices such as semiconductors and display units. PAA polymers are the processible, soluble precursor polymers of PI polymers. Among the many properties of PI polymers that make them favorable for these applications are a high glass transition (Tg) temperature, high thermal stability, high oxidative and hydrolytic stability, good electrical insulation/dielectric properties, strong mechanical attributes, a low coefficient of thermal expansion, and the like. Many PI polymers, and their PAA polymer precursors, are synthesized in solvents now classified as harmful, such as N-methyl-2-pyrrolidone (NMP), N,N-dimethyl acetamide (DMAc), and N,N-dimethyl formamide (DMF).

Much interest exists in finding alternative solvents to replace NMP and like materials in the synthesis of PI and PAA polymers. Such systems, however, need to exhibit not only a better environmental profile, but also comparable cost and performance.

SUMMARY

In one embodiment the invention is an improved process for synthesizing poly(amic acid) polymer, the process comprising the step of contacting under synthesis conditions and in a solvent system, (i) a cyclic tetracarboxylic dianhydride, e.g., pyromellitic dianhydride (PMDA), and (ii) a diamine monomer, e.g., 4,4'-diaminodiphenyl ether (ODA), the improvement comprising using a solvent system consisting essentially of:
 (A) a first component consisting essentially of N,N-dimethyl propionamide (DMPA), and
 (B) optionally, a second component consisting essentially of at least one of a sulfoxide, an alkyl phosphate, and an aprotic glycol ether.

In one embodiment the invention is an improved process for synthesizing a polyimide polymer from a poly(amic acid) polymer in a solvent system, the improvement comprising using a solvent system consisting essentially of:
 (A) a first component consisting of N,N-dimethyl propionamide (DMPA), and
 (B) optionally, a second component consisting essentially of at least one of a sulfoxide, an alkyl phosphate, and an aprotic glycol ether.

DETAILED DESCRIPTION

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Solvent" and like terms mean a substance that is capable of dissolving another substance (i.e., a solute) to form an essentially uniformly dispersed mixture (i.e., solution) at the molecular or ionic size level.

"Diamine" and like terms mean any compound containing two amine groups.

"Dianhydride" and like terms mean any compound containing two anhydride groups.

"Monomer" and like terms mean a compound that can undergo polymerization.

"Aprotic" and like terms describe a solvent, e.g., a glycol ether, that is not capable of donating a proton. Protic solvents are a solvents that have a hydrogen atom bound to an oxygen (as in a hydroxyl group) or a nitrogen (as in an amine group). In general terms, any solvent that contains labile H+ is a protic solvent. Representative protic solvents include DOWANOL™ DPM (dipropylene glycol methyl ether), DOWANOL™ TPM (tripropylene glycol methyl ether), DOWANOL™ DPnP (dipropylene glycol n-propyl ether), DOWANOL™ DPnB (dipropylene glycol n-butyl ether), and DOWANOL™ TPnB (tripropylene glycol n-propyl ether). The molecules of such solvents readily donate protons (H+) to reagents. The glycol ethers used in the practice of this invention do not contain labile H+. The commercially available aprotic solvents that can be used in the practice of this invention may contain minor amounts of residual protic compounds from the manufacturing process by which the aprotic solvent is made. "Minor amounts" means typically less than or equal to (≤) 1 wt %, or ≤0.5 wt %, or ≤0.1 wt %, or ≤0.05 wt %, or ≤0.01 wt %, of protic compound in the aprotic solvent based on the combined weight of the aprotic solvent and protic compound.

Poly(amic acid) is an intermediate polymer in the synthesis of polyimide. It is soluble in polar solvents due to strong hydrogen bonding.

Polyimide (PI) is a polymer made either from the polymerization of imide monomers or, as is the case in the present invention, from the ring closure of poly(amic acid). It is normally produced from the reaction of a cyclic tetracarboxylic dianhydride and a diamine that forms a poly(amic acid) that is subsequently ring closed by thermal and/or chemical means to form the imide moiety. One common PI used in the electronics industry is KAPTON™ It is produced from the condensation of pyromellitic dianhydride and 4,4'-oxydiphenylamine and its subsequent ring closure.

"Synthesis conditions" and like terms mean the pressure, and/or other conditions required to produce a product from reactants. In the context of producing a poly(amic acid) polymer from a dianhydride and a diamine, typical synthesis conditions include ambient temperature and pressure, e.g., 20° C. and atmospheric pressure, and an inert atmosphere, e.g., nitrogen.

Solvents

The solvents of this invention consist essentially of a first component and an optional second component. The first component consists essentially of, or consists of, DMPA.

The optional second component consists essentially of, or consists of, at least one of a sulfoxide, an alkyl phosphate, and an aprotic glycol ether. In one embodiment the second component consists essentially of, or consists of, a sulfoxide. In one embodiment the second component consists essentially of, or consists of, an alkyl phosphate. In one embodiment the second component consists essentially of, or consists of, an aprotic glycol ether. In one embodiment the second component consists essentially of, or consists of, a sulfoxide and an alkyl phosphate. In one embodiment the second component consists essentially of, or consists of, a sulfoxide and an aprotic glycol ether. In one embodiment the second component consists essentially of, or consists of, an alkyl phosphate and an aprotic glycol ether.

In one embodiment the second component consists essentially of, or consists of, two or more sulfoxides, or two or more alkyl phosphates, or two or more aprotic glycol ethers. In one embodiment the second component consists essentially of, or consists of, (i) two or more sulfoxides, and (ii) one or more alkyl phosphates, or one or more aprotic glycol ethers. In one embodiment the second component consists essentially of, or consists of, (i) two or more alkyl phosphates, and (ii) one or more sulfoxides, or one or more aprotic glycol ethers. In one embodiment the second component consists essentially of, or consists of, (i) two or more aprotic glycol ethers, and (ii) one or more sulfoxides or one or more alkyl phosphates. If the second component consists essentially of, or consists of, two or more materials, e.g., two or more sulfoxides, or two or more alkyl phosphates, or two or more aprotic glycol ethers, or at least two of a sulfoxide, an alkyl phosphate and aprotic glycol ether, then the second component is a blend that may or may not be phase separated.

If the solvent system consists of a first and second component, then the system is a blend that may or may not be phase separated. Homogeneous solvent systems, i.e., solvent systems in which the individual components are miscible with one another (are not phase separated), are preferred.

N,N-Dimethyl Propionamide (DMPA)

The first component consists of, or consists essentially of, DMPA (CAS Number 758-96-3).

Sulfoxides

In one embodiment the second component of the solvent of this invention consists essentially of, or consists of, a sulfoxide, i.e., a compound containing a sulfinyl functional group attached to two carbon atoms. It is a polar functional group. Sulfoxides are the oxidized derivatives of sulfides. Representative sulfoxides include, but are not limited to, diethyl sulfoxide, butyl sulfoxide, tetramethylene sulfoxide and dimethyl sulfoxide (DMSO).

Alkyl Phosphates

In one embodiment the second component of the solvent of this invention consists essentially of, or consists of, an alkyl phosphate, i.e., an organophosphate that is an ester of phosphoric acid and at least one corresponding alcohol. In monoalkyl phosphates ($RH_2PO_4$), only one of the three hydrogens of phosphoric acid are replaced by an alkyl group. In dialkyl phosphates ($R_2HPO_4$), two of the three hydrogens of phosphoric acid are replaced by alkyl groups. In trialkyl phosphates ($R_3HPO_4$), all three hydrogens of phosphoric acid are replaced by alkyl groups. R is an alkyl group of 1 to 12 carbon atoms, typically of 1 to 10 carbon atoms, and more typically of 2 to 6 carbon atoms. The alkyl group can be straight, branched or cyclic with straight preferred. Representative alkyl phosphates include, but are not limited to, methyl phosphate ($CH_3H_2PO_4$), ethyl phosphate ($CH_3CH_2H_2PO_4$), propyl phosphate ($CH_3CH_2CH_2H_2PO_4$), diethyl phosphate (($CH_3CH_2)_2HPO_4$), dipropyl phosphate (($CH_3CH_2CH_2)_2HPO_4$), triethyl phosphate (($CH_3CH_2)_3PO_4$), and tripropyl phosphate (($CH_3CH_2CH_2)_3PO_4$). Alkyl phosphates with actual or perceived environmental issues, e.g., dimethyl phosphate (($CH_3)_2HPO_4$) and trimethyl phosphate (($CH_3)_3PO_4$), are disfavored for use in the practice of this invention.

Glycol Ethers

In one embodiment of this invention, the second component of the solvent system consists essentially of, or consists of, an aprotic glycol ether, e.g., an acetylated or etherified compound based on an alkyl ether of ethylene glycol, propylene glycol or other alkyl, e.g., butyl, glycol. These compounds typically have a higher boiling point, together with the favorable solvent properties of lower-molecular weight ethers and alcohols. Representative aprotic glycol ethers include, but are not limited to, dipropylene glycol dimethyl ether, propylene glycol methyl ether acetate, propylene glycol diacetate, diethylene glycol n-butyl ether acetate, and dipropylene glycol methyl ether acetate. In contrast, protic solvents such as ethylene glycol monobutyl ether, ethylene glycol monopropyl ether, diethylene glycol monoethyl ether, propylene glycol methyl ether, dipropylene glycol monomethyl ether and tripropylene glycol monomethyl ether, are present in the solvent systems of this invention only as a residue of the manufacturing process from which the aprotic component of in the solvent system is made, and then in only minor amounts, e.g., less than or equal to ($\leq$) 1 wt %, based on the combined weight of the aprotic and protic compounds in the solvent system. The protic solvents are disfavored due to their tendency to react with the dianhydride reagent, e.g., monomer, of the process for making PAA, and tend to lead to PAA of lower molecular weight or lower inherent viscosity as compared to PAA made using an aprotic solvent.

The second component can consist essentially of, or consist of, one or more aprotic glycol ethers. In one embodiment the second component consists of one aprotic glycol ether. In one embodiment the second component consists essentially of, or consists of, two or more aprotic glycol ethers. In one embodiment the second component is an aprotic ethylene glycol alkyl ether. In one embodiment the second component is an aprotic propylene glycol alkyl ether. In one embodiment the alkyl component of the aprotic ethylene or propylene glycol ether is an alkyl group of 1 to 12, or 2 to 10, or 3 to 8, carbon atoms. In one embodiment the second component consists of, or is, ethylene glycol n-butyl ether acetate (CAS #112-07-02). In one embodiment the second component consists of, or is, propylene glycol methyl ether acetate (CAS #108-65-6). In one embodiment the second component consists of, or is, dipropylene glycol dimethyl ether (CAS Number 111109-77-4). Commercially available aprotic glycol ethers that can be used in the practice of this invention include, but are not limited to, DOWANOL™ PMA (propylene glycol methyl ether acetate), DOWANOL™ DPMA (dipropylene glycol methyl ether acetate), DOWANOL™ PGDA (propylene glycol diacetate), Butyl CELLOSOLVE™ acetate (ethylene glycol n-butyl ether acetate), Butyl CARBITOL™ acetate (diethylene glycol n-butyl ether acetate), and PROGLYDE™ DMM (dipropylene glycol dimethyl ether), all available from The Dow Chemical Company.

In one embodiment the second component consists of, or is, DMSO (CAS Number 67-68-5). In one embodiment the second component consists of, or is, triethyl phosphate (CAS Number 78-40-0). In one embodiment the second component consists of, or is, ethylene glycol butyl ether acetate. In one embodiment the second component consists of, or is, propylene glycol methyl ether acetate. In one embodiment the second component consists of, or is, dipropylene glycol dimethyl ether (CAS Number 111109-77-4). In one embodiment the second component consists essentially of, or consists of, (i) DMSO, and (ii) triethyl phosphate, or at least one of ethylene glycol n-butyl ether acetate, propylene glycol methyl ether acetate, and dipropylene glycol dimethyl ether. In one embodiment the second component consists essentially of, or consists of, (i) triethyl phosphate, and (ii) DMSO, or at least one of ethylene glycol n-butyl ether acetate, propylene glycol methyl ether acetate and dipropylene glycol dimethyl ether. In one embodiment the second component consists essentially of, or consists of, (i) at least one of ethylene glycol n-butyl ether acetate, propylene glycol methyl ether and dipropylene glycol dimethyl ether, and (ii) at least one of DMSO and triethyl phosphate.

Embodiments

In one embodiment the solvent system consists of DMPA.

In one embodiment the solvent system consists of DMPA and a sulfoxide.

In one embodiment the solvent system consists of DMPA and an alkyl phosphate.

In one embodiment the solvent system consists of DMPA and a trialkyl phosphate.

In one embodiment the solvent system consists of DMPA and an aprotic glycol ether.

In one embodiment the solvent system consists of DMPA, a sulfoxide and an alkyl phosphate.

In one embodiment the solvent system consists of DMPA, a sulfoxide and a glycol ether.

In one embodiment the solvent system consists of DMPA, an alkyl phosphate and an aprotic glycol ether.

In one embodiment the solvent system consists of DMPA, a sulfoxide, an alkyl phosphate and an aprotic glycol ether.

In one embodiment the solvent system consists of DMPA and DMSO.

In one embodiment the solvent system consists of DMPA and triethyl phosphate.

In one embodiment the solvent system consists of DMPA and at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

In one embodiment the solvent system consists of DMPA, DMSO and triethyl phosphate.

In one embodiment the solvent system consists of DMPA, DMSO and at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

In one embodiment the solvent system consists of DMPA, triethyl phosphate, and at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

In one embodiment the solvent system consists of DMPA, DMSO, triethyl phosphate, and at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

In one embodiment the solvent system consists of, or consists essentially of, in weight percent (wt %) based on the weight of the solvent system, from 10 to 100 wt %, or from 20 to 80 wt %, or from 30 to 70 wt %, or from 40 to 60 wt % of the first component, and from 0 to 90 wt %, or from 20 to 80 wt %, or from 30 to 70 wt % or from 40 to 60 wt % of the second component.

In one embodiment the solvent system consists of, or consists essentially of, in weight percent (wt %) based on the weight of the solvent system, from 10 to 100 wt %, or from 20 to 80 wt %, or from 40 to 60 wt %, of DMPA, and from 0 to 90 wt %, or from 20 to 80 wt %, or from 40 to 60 wt %, of one or more of a sulfoxide and an alkyl phosphate.

In one embodiment the solvent system consists of, or consists essentially of, in weight percent (wt %) based on the weight of the solvent system, from 30 to 100 wt %, or from 40 to 90 wt %, or from 45 to 65 wt %, of DMPA, and from 0 to 70 wt %, or from 10 to 60 wt %, or from 35 to 55 wt %, of a glycol ether.

In one embodiment the solvent system consists of, or consists essentially of, in weight percent (wt %) based on the weight of the solvent system, from 30 to 100 wt %, or from 40 to 90 wt %, or from 45 to 65 wt %, of DMPA, and from 0 to 70 wt %, or from 10 to 60 wt %, or from 35 to 55 wt %, of at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

In one embodiment the solvent system consists of, or consists essentially of, in weight percent (wt %) based on the weight of the solvent system, from 10 to 100 wt %, or from 20 to 80 wt %, or from 40 to 60 wt %, of DMPA, and from 0 to 90 wt %, or from 20 to 80 wt %, or from 40 to 60 wt %, of DMSO.

In one embodiment the solvent system consists of, or consists essentially of, in weight percent (wt %) based on the weight of the solvent system, from 10 to 100 wt %, or from 20 to 80 wt %, or from 40 to 60 wt %, of DMPA, and from 0 to 90 wt %, or from 20 to 80 wt %, or from 40 to 60 wt %, of triethyl phosphate.

In those embodiments in which the first and/or second component consists of more than one substance, e.g., the first component consists essentially of DMPA, and the second component consists essentially of two or more of DMSO, triethyl phosphate, and one or more aprotic glycol ether, the amount of each substance in a particular component can vary widely and to convenience. The amount of each individual substance in the component can vary from 0 to 100 wt %, or from 1 to 99 wt %, or from 10 to 90 wt %, or from 20 to 80 wt % or from 30 to 70 wt %, or from 40 to 60 wt %, or 50 wt %, based on the weight of the component.

Optional materials that are not essential to the operability of, but can be included in, the solvent systems of this invention include, but are not limited to, antioxidants, colorants, water scavengers, stabilizers, fillers, diluents (e.g., aromatic hydrocarbons), and the like. These materials do not have any material impact on the efficacy of the solvent system for providing a reaction medium for the synthesis of PI and/or PAA. These optional materials are used in known amounts, e.g., 0.10 to 5, or 4, or 3, or 2, or 1, weight percent based on the weight of the solvent system, and they are used in known ways.

Preparation of the Solvent System

Solvent systems of this invention consisting of, or consisting essentially of, two or more compounds, e.g., DMPA and DMSO and/or triethyl phosphate and/or an aprotic glycol ether, are made using known equipment and known techniques. The individual components of the solvent system are commercially available, liquid at ambient conditions (23° C. and atmospheric pressure), and can simply be mixed with one another using conventional mixing equipment and standard blending protocols. The components can be added to one another in any order including simultaneously.

Use of the Solvent Systems

The solvent systems of this invention are eco-solvents, i.e., they do not have, or have at a reduced level, the toxicology issues associated with NMP. These solvent systems are used in the same manner as mediums for the synthesis of PAA and PI as NMP or other polar aprotic solvent.

The following examples are nonlimiting illustrations of the invention.

EXAMPLES

PAA Synthesis

The following reaction scheme is a nonlimiting, representative illustration of a PAA synthesis in which the solvent systems of this invention can be used.

PAA Reaction Scheme

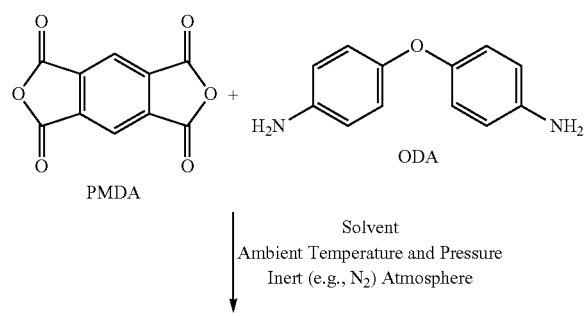

PMDA

ODA

Solvent
Ambient Temperature and Pressure
Inert (e.g., N$_2$) Atmosphere

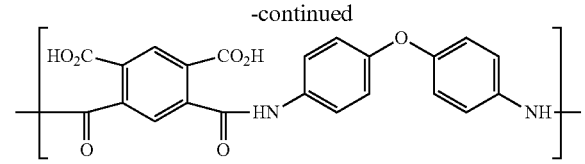

This scheme shows a simple reaction mechanism for producing a pyromellitic dianhydride (PMDA)/4,4'-diaminodiphenyl ether (ODA)-based PAA polymer with the exemplary repeating unit. There are many different types of dianhydride monomers and diamine monomers which can be polymerized through this illustrated polycondensation reaction to produce PAA and/or PI polymers with different properties and for different applications.

Other cyclic tetracarboxylic dianhydrides, beyond pyromellitic dianhydride, that can be used in the practice of this invention include, but are not limited to, those described by formula I in which R is an unsubstituted or substituted aliphatic or aromatic group.

Representative cyclic tetracarboxylic dianhydrides of formula I include, but are not limited to, 3,3'4,4'-biphenyltetracarboxylic dianhydride, 4,4'-(hexafluoroisopropylidene)-diphthalic anhydride, 3,3'4,4'-benzophenone-tetracarboxylic dianhydride, 1,2,3,4-cyclobutanetetra-carboxylic dianhydride, 3,3',4,4'-diphenyl-sulfonetetracarb oxylic dianhydride, oxydiphthalic dianhydride, etc., such as those identified in U.S. Pat. No. 9,346,927.

Other diamine monomers, beyond 4,4'-diaminodiphenyl ether, that can be used in the practice of this invention include, but are not limited to, those described by formula II in which R' is an unsubstituted or substituted aliphatic or aromatic group.

Preferably R' is an unsubstituted or substituted aromatic group. Representative diamines include, but are not limited to, 3,4'-diaminophenylether, 1,3-phenylenediamine, 1,4-phenylenediamine, 4,4'-diaminodiphenylsulfone, 2,4-diamino-toluene, 4,4'-diamino-diphenylmethane, 2,2-bis(4-aminophenyl)-1,1,1,3,3,3-hexafluoropropane, 1,4-bis(3-amino-phenoxy)benzene, 3,3'-dimethylbenzidine, etc., such as those identified in U.S. Pat. No. 9,346,927.

Formula III is representative of a repeating unit of the various polymers that can be produced from the reaction of a cyclic tetracarboxylic dianhydride of formula I and a diamine of formula II using a solvent system of this invention.

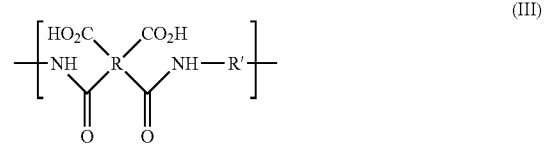

In one embodiment the PAA polymer is thermally converted, e.g., heated, into the PI polymer. In one embodiment the PAA is chemically converted, e.g., the PAA polymer is reacted with a ring-closing/dehydrating imidization agent such as acetic anhydride with a base catalyst, into the PI polymer. In one embodiment the PAA polymer is converted into the PI polymer using a combination of thermal and chemical techniques, e.g., reacting the PAA polymer with an imidization reagent at an elevated temperature. Imidization reagents and synthesis conditions for PI polymers are well known in the art, and are described in, among other publications, U.S. Pat. Nos. 3,410,826, 5,789,524 and 5,919,892.

Inherent Viscosity

Inherent viscosity, $\eta inh$, (also known as logarithmic viscosity number) is measured and calculated from the equation $$\eta inh = [\ln(t/to)]/c$$

where t is flow time in seconds of polymer solution in an Ubbelohde viscometer tube at 30.0° C.; "to" is flow time in seconds of the polymer dilution solvent of 1-methyl-2-pyrrolidinone (in the same Ubbelohde viscometer tube used for the polymer solution) measured at 30.0° C.; and c is the concentration of polymer in polymer dilution solvent at a concentration of 0.10 gram/deciliter (g/dL). For $\eta inh$ in the examples, an aliquot of polyamic acid solution is weighed into a volumetric flask and diluted with 1-methyl-2-pyrrolidinone at 20° C. to provide the polymer solution for measurement at a concentration of 0.10 g/dL. Inherent viscosity as a dilute solution viscosity measurement indicates the molecular weight of the polyamic acid prepared with a larger qinh value indicating higher molecular weight. A good alternative polymerization solvent system to NMP should result in qinh comparable (not less than 90%) or greater than a control polymerization in NMP.

For bulk solution viscosity measurements, an aliquot of the prepared 13 wt % polyamic acid solution is used to immerse a Brookfield LV Spindle 63 on a Brookfield DV-III Ultra Rheometer (Brookfield Engineering Laboratories, Middleboro, Mass., U.S.A.) with bulk solution viscosity measured in centipoise (cP) at 20° C. and spindle speed of 10 rpm. Bulk solution viscosity measurements reflect the weight percent polyamic acid, polyamic acid molecular weight, and how the polymer interacts with the solvent. It is preferred that polyamic acid solution of equivalent weight percent solids and equivalent molecular weight in an alternative solvent to NMP have a bulk viscosity of no more than 3× of that measured in NMP, more preferably no more than 2× of that measured in NMP, even more preferably comparable or less than that measured in NMP.

Comparative Example 1: 13 Wt % Poly(Amic Acid) in N-Methylpyrrolidinone

Into a magnetically stirred, 3-neck, 100 mL round-bottom flask under nitrogen sweep with Dean-Stark type trap and condenser is loaded 1-methyl-2-pyrrolidinone (50 mL) and toluene (10 mL). Toluene (10 mL) is distilled into Dean-Stark type trap and drained with Dean-Stark trap and condenser removed and flask placed under positive nitrogen. 4,4'-Diaminodiphenyl ether (3.676 g, 18.36 mmol) is added to the flask and dissolves at room temperature. Sublimed pyromellitic dianhydride (3.924 g, 17.99 mmol) and sublimed maleic anhydride (0.072 g, 0.73 mmol) are added to the flask with overhead stirring initiated. After 44 hours reaction time at room temperature, poly(amic acid) inherent viscosity=1.04 dL/g (1-methyl-2-pyrrolidinone, 0.10 g/dL, 30.0° C.) and bulk solution viscosity=2699 centipoise (20° C., 10 rpm on Brookfield DV-III Ultra with LV Spindle 63).

Comparative Example 2: 13 Wt % Poly(Amic Acid) in Dimethyl Sulfoxide

Into a magnetically stirred, 3-neck, 100 mL round-bottom flask under positive nitrogen is injected anhydrous dimethyl sulfoxide (46.7 mL). 4,4'-Diaminodiphenyl ether (3.676 g, 18.36 mmol) is added to the flask and dissolves at room temperature. Sublimed pyromellitic dianhydride (3.924 g, 17.99 mmol) and sublimed maleic anhydride (0.072 g, 0.73 mmol) are added to the flask with overhead stirring initiated. After 44 hours reaction time at room temperature, poly(amic acid) inherent viscosity=1.12 dL/g (1-methyl-2-pyrrolidinone, 0.10 g/dL, 30.0° C.) and bulk solution viscosity=4043 centipoise (20° C., 10 rpm on Brookfield DV-III Ultra with LV Spindle 63).

Comparative Example 3: 13 Wt % Poly(Amic Acid) in Triethyl Phosphate

Into a magnetically stirred, 3-neck, 100 mL round-bottom flask under nitrogen sweep with Dean-Stark type trap and condenser is loaded triethyl phosphate (47.9 mL) and toluene (10 mL). Toluene (10 mL) is distilled into Dean-Stark type trap and drained with Dean-Stark trap and condenser removed and flask placed under positive nitrogen. 4,4'-Diaminodiphenyl ether (3.676 g, 18.36 mmol) is added to the flask and dissolves at room temperature. Sublimed pyromellitic dianhydride (3.924 g, 17.99 mmol) and sublimed maleic anhydride (0.072 g, 0.73 mmol) are added to the flask with overhead stirring initiated. After 44 hours reaction time at room temperature, poly(amic acid) inherent viscosity=1.15 dL/g (1-methyl-2-pyrrolidinone, 0.10 g/dL, 30.0° C.) and bulk solution viscosity=5915 centipoise (20° C., 10 rpm on Brookfield DV-III Ultra with LV Spindle 63).

Inventive Example 1: 13 Wt % Poly(Amic Acid) in DMPA

Into a magnetically stirred, 3-neck, 100 mL round-bottom flask under nitrogen sweep with Dean-Stark type trap and condenser is loaded N,N-dimethylpropionamide (45 mL) and toluene (10 mL). Toluene (10 mL) is distilled into Dean-Stark type trap and drained with Dean-Stark trap and condenser removed and flask placed under positive nitrogen. 4,4'-Diaminodiphenyl ether (2.964 g, 14.80 mmol) is added to the flask and dissolves at room temperature. Sublimed pyromellitic dianhydride (3.164 g, 14.51 mmol) and sublimed maleic anhydride (0.058 g, 0.59 mmol) are added to the flask with overhead stirring initiated. After 44 hours reaction time at room temperature, poly(amic acid) inherent viscosity=1.15 dL/g (1-methyl-2-pyrrolidinone, 0.10 g/dL, 30.0° C.) and bulk solution viscosity=1272 centipoise (20° C., 10 rpm on Brookfield DV-III Ultra with LV Spindle 63).

Inventive Example 2: 13 Wt % Poly(Amic Acid) in DMPA and DOWANOL™ PMA

Into a magnetically stirred, 3-neck, 100 mL round-bottom flask under nitrogen sweep with Dean-Stark type trap and condenser is loaded N,N-dimethylpropionamide (25 mL) and DOWANOL™ PMA/propylene glycol methyl ether acetate (35 mL). DOWANOL™ PMA (10 mL) is distilled into Dean-Stark type trap and drained with Dean-Stark trap and condenser removed and flask placed under positive nitrogen. 4,4'-Diaminodiphenyl ether (3.378 g, 16.87 mmol) is added to the flask and dissolves at room temperature. Sublimed pyromellitic dianhydride (3.606 g, 16.53 mmol) and sublimed maleic anhydride (0.066 g, 0.67 mmol) are added to the flask with overhead stirring initiated. After 44 hours reaction time at room temperature, poly(amic acid) inherent viscosity=1.26 dL/g (1-methyl-2-pyrrolidinone, 0.10 g/dL, 30.0° C.) and bulk solution viscosity=4647 centipoise (20° C., 10 rpm on Brookfield DV-III Ultra with LV Spindle 63).

Inventive Example 3: 13 Wt % Poly(amic acid) in Triethyl Phosphate and DMPA

Into a magnetically stirred, 3-neck, 100 mL round-bottom flask under nitrogen sweep with Dean-Stark type trap and condenser is loaded triethyl phosphate (25 mL), N,N-dimethylpropionamide (25 mL), and toluene (10 mL). Toluene (10 mL) is distilled into Dean-Stark type trap and drained with Dean-Stark trap and condenser removed and flask placed under positive nitrogen. 4,4'-Diaminodiphenyl ether (3.565 g, 17.80 mmol) is added to the flask and dissolves at room temperature. Sublimed pyromellitic dianhydride (3.806 g, 17.45 mmol) and sublimed maleic anhydride (0.070 g, 0.71 mmol) are added to the flask with overhead stirring initiated. After 44 hours reaction time at room temperature, poly(amic acid) inherent viscosity=1.26 dL/g (1-methyl-2-pyrrolidinone, 0.10 g/dL, 30.0° C.) and bulk solution viscosity=2687 centipoise (20° C., 10 rpm on Brookfield DV-III Ultra with LV Spindle 63).

Inventive Example 4: 13 Wt % Poly(Amic Acid) in DMPA and DMSO

Into a magnetically stirred, 3-neck, 100 mL round-bottom flask under nitrogen sweep with Dean-Stark type trap and condenser is loaded N,N-dimethylpropionamide (25 mL), and toluene (5 mL). Toluene (5 mL) is distilled into Dean-Stark type trap and drained with Dean-Stark trap and condenser removed and flask placed under positive nitrogen. Anhydrous dimethyl sulfoxide (25 mL) is injected into the flask. 4,4'-Diaminodiphenyl ether (3.616 g, 18.06 mmol) is added to the room temperature flask and dissolves at room temperature. Sublimed pyromellitic dianhydride (3.860 g, 17.70 mmol) and sublimed maleic anhydride (0.070 g, 0.71 mmol) are added to the flask with overhead stirring initiated. After 44 hours reaction time at room temperature, poly(amic acid) inherent viscosity=1.20 dL/g (1-methyl-2-pyrrolidinone, 0.10/dL, 30.0° C.) and bulk solution viscosity=1560 centipoise (20° C., 10 rpm on Brookfield DV-III Ultra with LV Spindle 63).

Inventive Example 5. 13 Wt % Poly(Amic Acid) in DMPA and Butyl CELLOSOLVE™ Acetate Into a magnetically stirred, 3-neck, 100 mL round-bottom flask under nitrogen sweep with Dean-Stark type trap and condenser is loaded butyl CELLOSOLVE™ acetate (17.5 mL), N,N-dimethylpropionamide (32.5 mL), and toluene (10 mL). Toluene (10 mL) is distilled into Dean-Stark type trap and drained with Dean-Stark trap and condenser removed and flask placed under positive nitrogen. 4,4'-Diaminodiphenyl ether (3.316 g, 16.56 mmol) is added to the room temperature flask and dissolves at room temperature. Sublimed pyromellitic dianhydride (3.540 g, 16.23 mmol) and sublimed maleic anhydride (0.065 g, 0.66 mmol) are added to the flask with overhead stirring initiated. After 44 hours reaction time at room temperature, polyamic acid inherent viscosity=1.33 dL/g (1-methyl-2-pyrrolidinone, 0.10 g/dL, 30.0° C.) and bulk solution viscosity=3299 centipoise (20° C., 10 rpm on Brookfield DV-III Ultra with LV Spindle 63).

TABLE

Summary of Comparative Examples and Inventive Examples.

| | Solvent | $\eta_{inh}$, dL/g (30° C., NMP, 0.1 g/dL) | Bulk viscosity @20° C., cPs |
|---|---|---|---|
| CE1 | NMP Controls | 0.92 to 1.04 | 1824 to 2699 |
| CE 2 | Dimethyl sulfoxide (DMSO) | 1.12 | 4043 |
| CE 3 | Triethyl phosphate (TEP) | 1.15 | 5915 |
| IE 1 | N,N-dimethylpropionamide (DMPA) | 1.15 | 1272 |
| IE 2 | 50/50(v/v) DMPA/DOWANOL ™ PMA | 1.26 | 4847 |
| IE 3 | 50/50 (v/v) DMPA/TEP | 1.26 | 2687 |
| IE 4 | 50/50 (v/v) DMPA/DMSO | 1.20 | 1560 |
| IE 5 | 65/35 (v/v) DMPA/Butyl CELLOSOLVE ™ acetate | 1.33 | 3299 |

The inventive solvents of the Table illustrate that under the same reaction conditions of time, temperature, monomer ratio stoichiometries, and solids loadings as the NMP control polymerizations, that the inventive solvents result in equivalent or higher molecular weight (MW) and in some cases, in spite of the higher molecular weight, have a lower bulk solution viscosity value.

DMPA shows the comparable or higher molecular weight of the synthesized PAA compared to NMP. However, the bulk viscosity of the PAA solution is much lower than NMP without adding any additives to control the bulk viscosity of the PAA solution. Lowering both the bulk viscosity and the surface tension provide an advantage for the downstream coating or filming process.

Blends of DMPA with other polar aprotic solvents like TEP and DMSO show comparable or higher molecular weight of the synthesized PAA compared to NMP. The bulk viscosity of the blends are lower or comparable which will facilitate the downstream processing (as well as lower cost) providing flexibility in having lower bulk viscosities at equivalent molecular weight or allow higher polymer solution loadings than the comparative examples.

Blends of DMPA with aprotic solvents like DOWANOL™ PMA and Butyl CELLOSOLVE™ acetate also show the comparable or higher MW of the synthesized PAA compared to NMP. However, the bulk viscosity of the PAA solution is higher than the PAA prepared with NMP. The bulk viscosity can be controlled via molecular weight control during the reaction and/or adding viscosity thinner as additive to lower the bulk viscosity of the PAA solution. These mixed/blend solvent systems can provide advantages on the downstream processing such as easier casting/spin coating, easier evaporation, better color, better/faster processing to make coatings/films due to the attributes of the aprotic glycol ethers that relate to their properties/attributes whether it be viscosity, solubility parameters, volatility/evaporation rate, etc.

What is claimed is:
1. A process for synthesizing poly(amic acid) polymer, the process comprising the step of contacting under synthesis conditions and in a solvent system, (i) a cyclic tetracarboxylic dianhydride, and (ii) a diamine monomer, wherein the solvent system consisting essentially of:

(A) a first component of N,N-dimethyl propionamide (DMPA), and (B) a second component of dimethyl sulfoxide (DMSO).

2. The process of claim 1 in which the solvent system consists essentially of, based on the weight of the solvent system, from 20 to 80 wt % of the first component and from 20 to 80 wt % of the second component.

3. A process for synthesizing poly(amic acid) polymer, the process comprising the step of contacting under synthesis conditions and in a solvent system, (i) a cyclic tetracarboxylic dianhydride, and (ii) a diamine monomer, wherein the solvent system consisting essentially of:

(A) N,N-dimethyl propionamide (DMPA), and (B) triethyl phosphate.

4. A process for synthesizing poly(amic acid) polymer, the process comprising the step of contacting under synthesis conditions and in a solvent system, (i) a cyclic tetracarboxylic dianhydride, and (ii) a diamine monomer, wherein the solvent system consisting essentially of:

(A) a first component of N,N-dimethyl propionamide (DMPA), and (B) a second component consisting of at least one of propylene glycol methyl ether acetate, dipropylene glycol methyl ether acetate, propylene glycol diacetate, ethylene glycol n-butyl ether acetate, diethylene glycol n-butyl ether acetate, and dipropylene glycol dimethyl ether.

* * * * *